UNITED STATES PATENT OFFICE.

ALBERT ERNST, OF BALTIMORE, MARYLAND.

IMPROVEMENT IN REVIVIFYING CHARCOAL USED IN RECTIFYING SPIRITS.

Specification forming part of Letters Patent No. 136,229, dated February 15, 1873.

*To all whom it may concern:*

Be it known that I, ALBERT ERNST, of the city of Baltimore, in the State of Maryland, have invented an Improved Compound and Process for Cleansing Charcoal used in the Rectification of Spirits, of which the following is a specification.

Nature and Objects of the Invention.

My invention consists in the removal from charcoal, used in the rectification of spirits, of the fusel-oil and other impurities, and is a new chemical compound employed for the purpose.

General Description.

It is well known that charcoal employed for the filtration and rectification of high-wines and other spirits becomes charged with the fusel-oil and impurities which it is employed to remove, and hence loses its effect. I have discovered and produced, after protracted experiments, a compound by means of which such fusel-oil and impurities can be effectually washed out and removed from the charcoal, restoring the latter to its effective condition, and, in fact, adapting it to act upon the spirits with better effect and success than charcoal in its original state.

My compound is as follows: Sulphuric acid, seventy-five (75) parts; chloride of lime, fifteen (15) parts; cream of tartar, ten (10) parts. This compound I mix thoroughly with water in the proportions of two (2) pounds of said mass or compound to one hundred (100) pounds of water, and filter the solution through the used charcoal, by which means all impure and oily matter is completely removed. I then run clear water through the charcoal until the water coming therefrom gives no trace of acid by the use of litmus paper. The coal will then be found perfectly pure and free from injurious or foreign matter, and in a better condition than originally for the rectification of spirits, so that spirits filtered through the renewed and cleansed coal are found to possess greater purity and finer flavor than spirits filtered through new coal.

I am aware that some of the ingredients of my composition have before been employed for revivifying bone-black used for refining sugar; such process and such separate ingredients, therefore, I do not claim.

Claim.

I claim as new—

The compound hereinbefore described, for restoring and purifying charcoal employed in the rectifying of spirits.

ALBERT ERNST.

Witnesses:
 OCTAVIUS KNIGHT,
 WALTER ALLEN.